United States Patent
Dow et al.

(10) Patent No.: US 10,984,363 B2
(45) Date of Patent: *Apr. 20, 2021

(54) SUMMARIZATION OF A RECORDING FOR QUALITY CONTROL

(71) Applicant: INTERNATIONAL BUSINESS MACHINES CORPORATION, Armonk, NY (US)

(72) Inventors: Eli M. Dow, Wappingers Falls, NY (US); Erin M. Farr, Fishkill, NY (US); Michael E. Gildein, II, Wappingers Falls, NY (US); Moses J. Vaughan, Mahwah, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 844 days.

This patent is subject to a terminal disclaimer.

(21) Appl. No.: 14/845,323

(22) Filed: Sep. 4, 2015

(65) Prior Publication Data
US 2017/0068920 A1    Mar. 9, 2017

(51) Int. Cl.
*G06Q 10/06* (2012.01)
*G06K 9/00* (2006.01)
(Continued)

(52) U.S. Cl.
CPC ... *G06Q 10/06398* (2013.01); *G06F 16/2457* (2019.01); *G06F 16/436* (2019.01);
(Continued)

(58) Field of Classification Search
CPC combination set(s) only.
See application file for complete search history.

(56) References Cited

U.S. PATENT DOCUMENTS 6,263,049 B1 *   7/2001   Kuhn ............... H04M 3/51
                                                   379/265.06
6,646,676 B1 * 11/2003   DaGraca ......... G06K 9/00771
                                                      348/155
(Continued)

FOREIGN PATENT DOCUMENTS

EP      1466274 A2    10/2004
EP      2471023 A1     7/2012
(Continued)

OTHER PUBLICATIONS

List of IBM Patents or Patent Applications Treated as Related—Date Filed: Oct. 28, 2015; 2 pages.
(Continued)

*Primary Examiner* — Crystol Stewart
(74) *Attorney, Agent, or Firm* — Cantor Colburn LLP; Teddi Maranzano

(57) ABSTRACT

Embodiments include method, systems and computer program products for performing summarization of a recording based on biometric and business process data. Aspects include receiving a recording of a customer service representative performing a task, receiving a biometric data from a sensor configured to monitor the customer service representative during the performance of the task and obtaining a business process data relating to one or more of the task and the customer service representative. Aspects also include identifying one or more portions of interest from the recording based on one or more of the biometric data and the business process data and compiling the one or more portions of interest into a summarization of the task.

11 Claims, 4 Drawing Sheets

(51) Int. Cl.
*G06F 16/78* (2019.01)
*G06F 16/2457* (2019.01)
*G06F 16/435* (2019.01)
*G06Q 30/00* (2012.01)

(52) U.S. Cl.
CPC ......... *G06F 16/78* (2019.01); *G06K 9/00751* (2013.01); *G06K 9/00885* (2013.01); *G06Q 10/0639* (2013.01); *G06Q 30/016* (2013.01); *G06K 2009/00939* (2013.01); *G06K 2209/27* (2013.01)

(56) References Cited

U.S. PATENT DOCUMENTS

| | | | | |
|---|---|---|---|---|
| 7,489,334 B1* | 2/2009 | Pickering | | G06K 9/00771 348/155 |
| 8,180,885 B2 | 5/2012 | Bodin et al. | | |
| 8,373,618 B2 | 2/2013 | Friedrich et al. | | |
| 8,442,578 B2 | 5/2013 | Kass et al. | | |
| 8,654,937 B2* | 2/2014 | Agapi | | H04M 3/5175 379/265.02 |
| 8,655,796 B2 | 2/2014 | Udani | | |
| 8,831,299 B2 | 9/2014 | Kurtz et al. | | |
| 9,844,344 B2* | 12/2017 | Horseman | | G06F 19/3418 |
| 2001/0033330 A1* | 10/2001 | Garoutte | | G06K 9/00771 348/153 |
| 2005/0075213 A1* | 4/2005 | Arick | | A63B 24/00 482/1 |
| 2005/0111824 A1* | 5/2005 | Hunter | | G06K 9/00711 386/240 |
| 2005/0125275 A1* | 6/2005 | Wright | | G06Q 10/06311 705/7.15 |
| 2006/0184538 A1* | 8/2006 | Randall | | G06F 17/30032 |
| 2006/0229086 A1* | 10/2006 | Broad | | G01D 21/00 455/456.1 |
| 2007/0038352 A1* | 2/2007 | Larschan | | G06Q 10/06 701/33.4 |
| 2007/0100851 A1* | 5/2007 | Golovchinsky | | G06F 17/30817 |
| 2007/0279494 A1* | 12/2007 | Aman | | H04N 5/232 348/169 |
| 2009/0007202 A1* | 1/2009 | Williams | | H04N 7/17309 725/105 |
| 2009/0019310 A1* | 1/2009 | Nastacio | | G06Q 10/06 714/26 |
| 2009/0089558 A1* | 4/2009 | Bradford | | G05B 21/02 712/225 |
| 2010/0004977 A1* | 1/2010 | Marci | | G06Q 10/10 705/7.32 |
| 2010/0127922 A1* | 5/2010 | Sooy | | G06Q 10/00 342/357.43 |
| 2012/0099793 A1* | 4/2012 | Kumar | | G06K 9/00751 382/190 |
| 2012/0127306 A1* | 5/2012 | Oh | | G08B 13/19613 348/143 |
| 2013/0030875 A1* | 1/2013 | Lee | | G06Q 10/06311 705/7.38 |
| 2013/0059607 A1* | 3/2013 | Herz | | H04W 4/029 455/456.3 |
| 2013/0080891 A1* | 3/2013 | Byun | | G06F 9/4443 715/704 |
| 2013/0251216 A1 | 9/2013 | Smowton et al. | | |
| 2014/0147018 A1 | 5/2014 | Argue et al. | | |
| 2014/0280136 A1* | 9/2014 | Marshall | | G06Q 10/0637 707/736 |
| 2014/0333775 A1* | 11/2014 | Naikal | | H04N 7/181 348/159 |
| 2014/0347479 A1* | 11/2014 | Givon | | G06K 9/00342 348/143 |
| 2014/0361905 A1* | 12/2014 | Sadasivam | | G08C 17/02 340/870.01 |
| 2015/0077259 A1 | 3/2015 | Kumar et al. | | |
| 2015/0147045 A1* | 5/2015 | Birnkrant | | G06K 9/00751 386/241 |
| 2015/0199810 A1* | 7/2015 | Lee | | G06K 9/00771 382/103 |
| 2015/0269513 A1* | 9/2015 | Kaneko | | G06Q 10/06311 705/7.15 |
| 2015/0317801 A1* | 11/2015 | Bentley | | H04N 7/181 382/107 |
| 2016/0055381 A1* | 2/2016 | Adsumilli | | G06K 9/00751 386/241 |
| 2016/0103706 A1* | 4/2016 | Novaes | | G06Q 10/10 718/102 |
| 2016/0157776 A1* | 6/2016 | Mestha | | A61B 5/02427 600/479 |
| 2016/0275356 A1* | 9/2016 | Kuwahara | | G08B 13/19669 |
| 2016/0343402 A1* | 11/2016 | Singhal | | G11B 27/005 |
| 2017/0017517 A1* | 1/2017 | Kandappan | | G06F 9/54 |
| 2017/0109584 A1* | 4/2017 | Yao | | G06K 9/00718 |

FOREIGN PATENT DOCUMENTS

| | | |
|---|---|---|
| EP | 2515500 A1 | 10/2012 |
| WO | 03000015 A2 | 1/2003 |
| WO | 03019184 A1 | 3/2003 |
| WO | 2006054169 A1 | 5/2006 |
| WO | 2012159070 A2 | 11/2012 |

OTHER PUBLICATIONS

U.S. Appl. No. 14/923,921, filed Oct. 27, 2015; Entitled: Summarization of a Recording for Quality Control.
List of IBM Patents or Patent Applications Treated As Related—Date Filed: Mar. 15, 2019; 2 pages.
Dow et al., "Summarization of a Recording for Quality Control" U.S. Appl. No. 14/923,921, filed Oct. 27, 2015.

\* cited by examiner

SUMMARIZATION OF A RECORDING FOR QUALITY CONTROL

BACKGROUND

The present disclosure relates to summarization or a recording and more specifically, to methods, systems and computer program products for performing summarization of a recording based on biometric and business process data for quality control monitoring.

Consumers routinely rely on customer service representatives to perform contracted tasks, such as repairing a car, performing surgery, or the like in an expected manner. However, mistakes do happen and often a consumer or employer is left wondering how to prove that a contracted service was performed improperly. Today a consumer's course of action may be to hire an additional expert service provider for a second opinion regarding how the service was provided. In some cases, an employer may use video to record the working environment of employees and it may instigate a review of the video upon discovery of a problem. If a problem is discovered, the employer may take actions to prevent a reoccurrence with future consumer.

Video summarization is one way to facilitate sharing video data, specifically the relevant information from that video, with other parties. Video summarization techniques collect a subset of frames, for example based on saliency of each frame, to provide a story using fewer frames of the video. Some currently available video summarization techniques use a standard sampling rate to select a subset of frames for collection. For example, the a single frame out of a fixed number of frames, i.e., 1/10, 1/20, may be selected and the ratio of the number of selected frames to fixed frames can be determined based on the application.

SUMMARY

In accordance with an embodiment, a method for performing summarization of a recording based on biometric and business process data is provided. The method includes receiving the recording of a customer service representative performing a task, receiving a biometric data from a sensor configured to monitor the customer service representative during the performance of the task and obtaining a business process data relating to one or more of the task and the customer service representative. The method also includes identifying one or more portions of interest from the recording based on one or more of the biometric data and the business process data and compiling the one or more portions of interest into a summarization of the task.

In accordance with another embodiment, a system for performing summarization of a recording based on biometric and business process data includes a processor in communication with one or more types of memory. The processor is configured to receive the recording of a customer service representative performing a task, receive a biometric data from a sensor configured to monitor the customer service representative during the performance of the task and obtain a business process data relating to one or more of the task and the customer service representative. The processor is further configured to identify one or more portions of interest from the recording based on one or more of the biometric data and the business process data and compile the one or more portions of interest into a summarization of the task.

In accordance with a further embodiment, a computer program product for performing summarization of a recording based on biometric and business process data includes a non-transitory storage medium readable by a processing circuit and storing instructions for execution by the processing circuit for performing a method. The method includes receiving the recording of a customer service representative performing a task, receiving a biometric data from a sensor configured to monitor the customer service representative during the performance of the task and obtaining a business process data relating to one or more of the task and the customer service representative. The method also includes identifying one or more portions of interest from the recording based on one or more of the biometric data and the business process data and compiling the one or more portions of interest into a summarization of the task.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for performing summarization of a recording based on biometric and business process data are provided. In exemplary embodiments, a video capture device is configured to record a customer service representative performing a task and a biometric sensor is configured to capture biometric data from the customer service representative while he is performing the task. The video and the biometric data are provided to a processing system that is configured to create a summarization of the video by compiling frames from the video that are selected based on the biometric data. The processing system is also configured to select frames from the video based on stored business process data relating to the customer service representative and/or the task.

In exemplary embodiments, the biometric data and stored business process data are used by the processing system to identify particular frames, or frame subsets, from the video as important and to include them in the video summarization. For example, an accelerated heart rate or high blood pressure could be an indicator of anxiety on the part of the customer service representative while performing a task, which may increase the chances of an error being made. The chance of errors being made may also increase at the end of a shift while a customer service representative is most fatigued. Accordingly, the processing system may sample video frames during these timing windows at a higher rate than during other time windows.

Although the disclosure primarily discusses performing summarization of a recording in terms that relate to the summarization of a video recording, it will be appreciated by those of ordinary skill in the art that the same techniques, methods and systems can be used to perform summarization of an audio recording. In addition, the term customer service representative is not intended to be limiting in any way and it will be appreciate by those of ordinary skill in the art that the summarization techniques disclosed herein may be applied to any recording of an individual that can be linked to a task entity.

Figure 1:
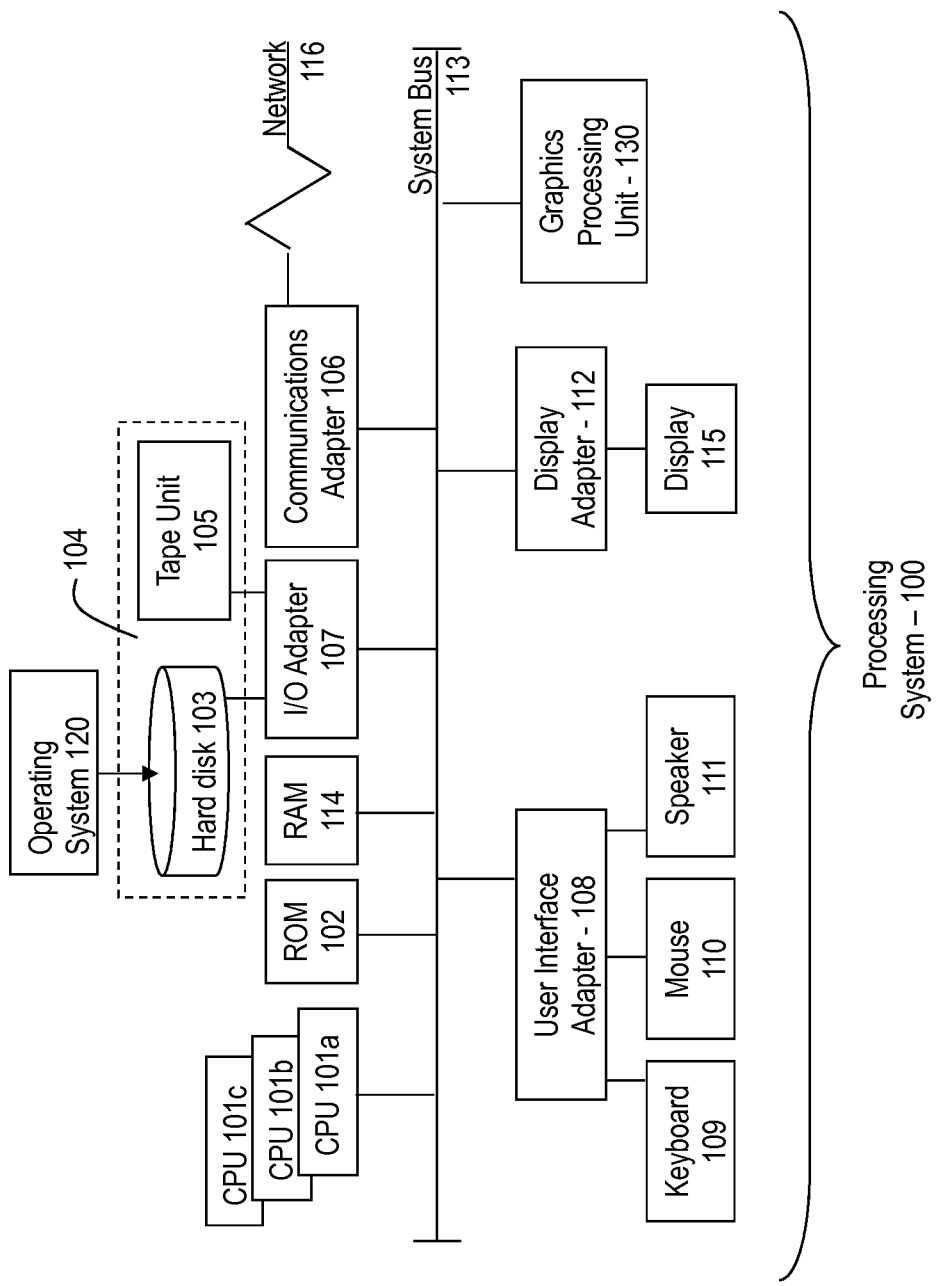
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
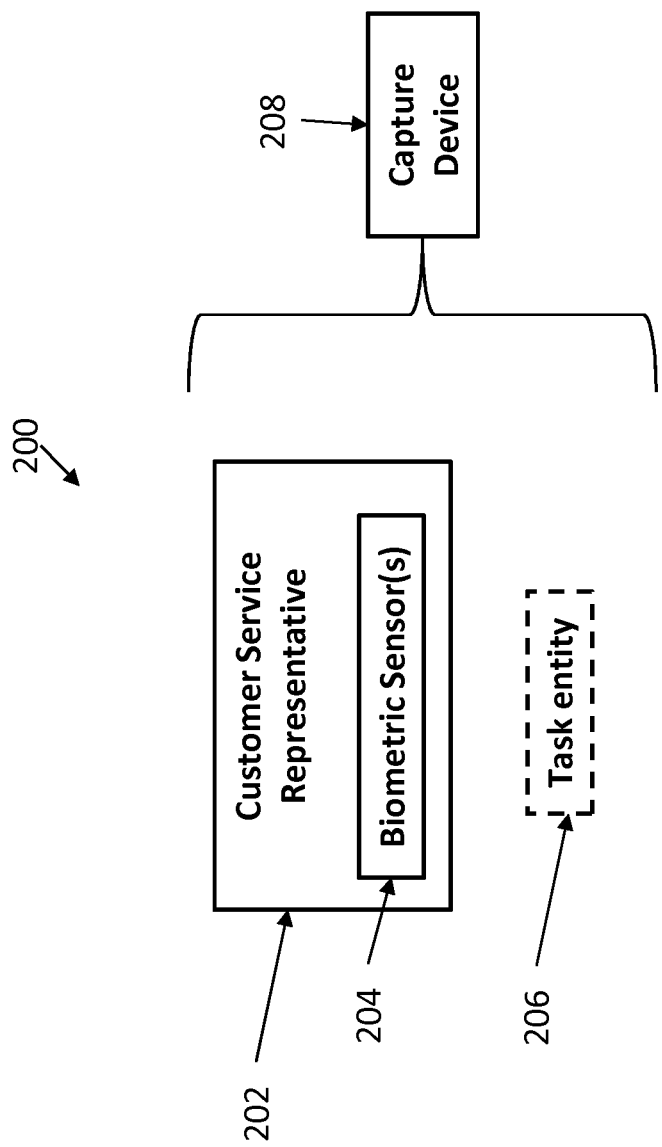
FIG. 2 is a block diagram illustrating a customer service environment in accordance with an exemplary embodiment.

Referring now to FIG. 2, a customer service environment 200 including a customer service representative 202 in accordance with an embodiment is illustrated. As illustrated, the environment 200 includes a capture device 208 that is configured to record the actions of a customer service representative 202 who is performing a task. In exemplary embodiments, the customer service representative 202 may be performing the task on a task entity 206. In exemplary embodiments, the capture device 208 may be a video capture device, an audio capture device or a combination thereof. The video capture device may be any suitable video capture device that can capture video of the customer service representative's 202 interaction with the task entity, including but not limited to a body camera on the customer service representative 202, a security camera, a webcam, or the like. For example, the customer service representative 202 may be a mechanic and task entity 206 may be a car. The customer service representative 202 is monitored by one or more biometric sensors 204 that are configured to capture biometric data from the customer service representative while he is performing the task. In exemplary embodiments, the biometric sensors 204 may be implemented in various forms, such as a watch, headband or alternate clothing, ring, biostamps (a mesh of circuits and sensors that can record electrophysiological data like skin temperature and hydration state of the wearer) and other "epidermal electronics." In one embodiment, the biometric sensors 204 may be an ECG (electrocardiograph) & EEG (electroencephalography) biosensor, such as the ones sold by Neurosky.

In exemplary embodiments, the biometric sensor 204 is configured to communicate with the capture device 208 and the capture device 208 may utilize input from the biometric sensor 204 to determine when to record. For example, the biometric sensor 204 may be used to determine when the customer service representative 202 is performing a task and the capture device 208 may only record while the task is being performed.

Figure 3:
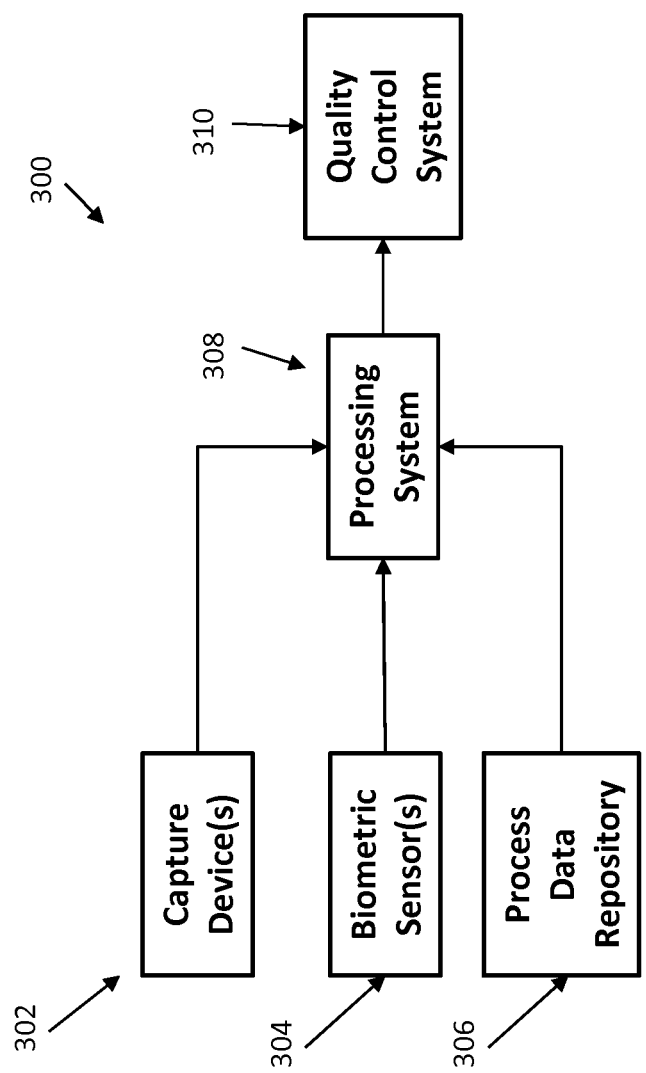
FIG. 3 is a block diagram of a system for performing summarization of a recording based on biometric and business process data in accordance with an exemplary embodiment.

Referring now to FIG. 3, a system 300 for performing summarization of a recording based on biometric and business process data in accordance with an exemplary embodiment is illustrated. The system 300 includes one or more capture devices 302, one or more biometric sensors 304 and a process data repository 306 which are all in communication with a processing system 308, which may be a processing system similar to the one shown in FIG. 1. In exemplary embodiments, a recording that includes audio and/or video from the capture devices 302 and data from the biometric sensors 304 are provided to processing system 308, which is configured to create a summarization by compiling frames from the recording that are selected based on the biometric data. In exemplary embodiments, the processing system 308 is also configured to select frames from the recording based on business process data relating to the customer service representative and/or the task that is received from the process data repository 306. In exemplary embodiments, the biometric data and stored business process data are used by the processing system 308 to identify particular frames, or frame subsets, from the video as important and includes them in a summarization created by the processing system 308.

For example, an accelerated heart rate or high blood pressure could be an indicator of anxiety or stress on the part of the customer service representative while performing a task, which may increase the chances of an error being made. The chance of errors being made may also increase at the end of a shift while a customer service representative is most fatigued. Accordingly, the video processing system may sample video frames during these timing windows at a higher rate than during other time windows. In exemplary embodiments, the video processing system is configured to create a video summarization of the customer service representative performing the task that has an increased sampled frame rate, during time periods that heuristics of the video processing system identify as important periods.

In exemplary embodiments, the system 300 also includes a quality control system 310 that is configured to receive the summarization of the customer service representative performing the task from the processing system 308. The quality control system 310 may be a processing system similar to the one shown in FIG. 1 that is configured to allow an individual to review the performance of the customer service representative performing the task. In exemplary embodiments, the review of the summarization video of the customer service representative performing the task may be performed either in real-time, or as a post-process, to ensure to the service receiver the quality is as expected. In exemplary embodiments, the video summarization is analyzed by a third party (e.g., a subject matter expert), who creates and sends the results of their analysis back to any of the stakeholders, e.g., the service requestor, the service provider's company, or any third party rating system for which consumers may want quality history.

Examples of disciplines in which a video summarization system may be used include, but are not limited to: medicine (e.g. surgery, physical therapy); auto repair; home repair (e.g. plumbing, electrical); vehicle operators (e.g. detect if fell asleep at wheel, detect areas in route which driver is anxious about safety which could help detect safer routes); law enforcement; and airline industry (e.g. focus on quality during shift changes).

Figure 4:
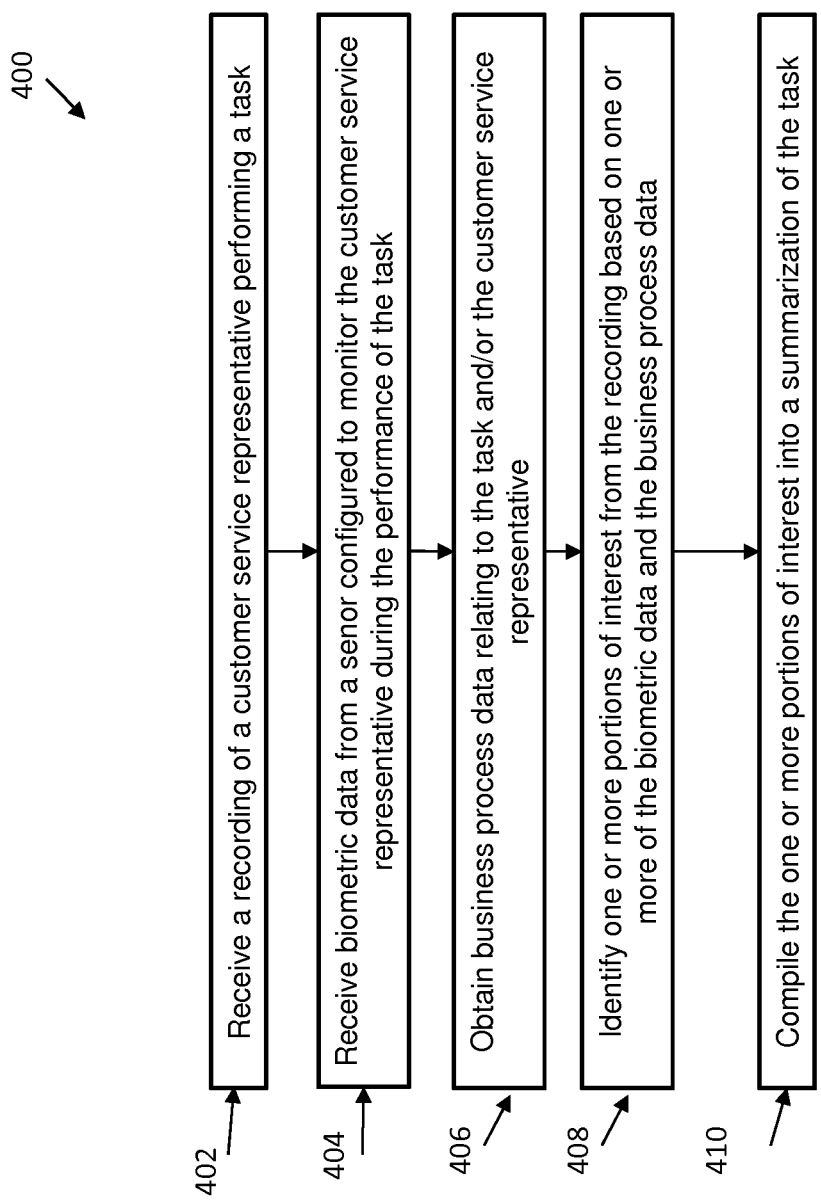
FIG. 4 is a flow diagram of a method for performing summarization of a recording based on biometric and business process data in accordance with an exemplary embodiment.

Referring now to FIG. 4, a flow diagram of a method 400 for performing summarization of a recording based on biometric and business process data in accordance with an exemplary embodiment is shown. As shown at block 402, the method 400 includes receiving a recording of a customer service representative performing a task. In exemplary embodiments, the video may include multiple videos that are taken from different angles to show the customer service representative performing the task. Next, as shown at block 404, the method 400 includes receiving biometric data from one or more biometric sensors configured to monitor the customer service representative during the performance of the task. In exemplary embodiments, the biometric sensors may be disposed on the customer service representative or they may be separate from the customer service representative. The method 400 includes obtaining a business process data relating to one or more of the task and the customer service representative, as shown at block 406. In exemplary embodiments, the business process data may include, but is not limited to, information about the hours the customer service representative has been working, the various steps required to perform the task, an importance level for each of the steps required to perform the task, and an expected duration of each of steps required to perform the task.

Continuing with reference to FIG. 4, as shown at block 408, the method 400 also includes identifying one or more portions of interest from the recording based on one or more of the biometric data and the business process data. In one embodiment, the one or more portions of interested are identified based on the biometric data exceeding a maximum threshold value, i.e., the customer service representative's heart rate is over a maximum heart rate. In another embodiment, the one or more portions of interested are identified based on the biometric data falling below a minimum threshold value. In a further embodiment, the one or more portions of interested are identified based on a time period during the performance of the task in the business process data. For example, the business process data may indicate that the time period at the end of the task is highly susceptible to errors by the customer service representative and accordingly, a higher number of frames from a video may be identified during this time period. In another embodiment, the one or more portions of interested are identified based on a rate of change of the biometric data falling outside of an acceptable range. For example, the biometric data is may be increasing or decreasing a rate that suggests that the customer service representative may be experiencing a medical emergency.

In exemplary embodiments, identifying one or more frames of interest from the video includes sampling frames from the video at a rate that is determined based one or more of the biometric data and the business process data. In one embodiment, the rate is positively correlated with biometrically determined trigger, such as a stress level, of the customer service representative as indicated by the biometric data. In another embodiment, the rate is positively correlated with duration of time that the customer service representative has been continuously working as indicated by the business process data.

The method 400 also includes compiling the one or more portions of interest into a summarization of the task, as shown at block 410. In exemplary embodiments, the method 400 may further include transmitting the video summarization of the task to a quality review system for analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for performing summarization of a recording based on biometric and business process data, the computer program product comprising:
    a non-transitory storage medium readable by a processing circuit and storing instructions for execution by the processing circuit for performing a method comprising:
        receiving the recording of a customer service representative performing a task;
        receiving a biometric data from a sensor configured to monitor the customer service representative during the performance of the task;
        obtaining business process data relating to one or more of the task and the customer service representative, the business process data comprising an indicator that identifies a time period that is more susceptible to errors by the customer service representative while performing the task;
        determining a duration of time that the customer service representative has been continuously working based on the business process data;
        determining that the biometric data over a first period of time is indicative of an increased anxiety level for the customer service representative;
        identifying one or more portions of interest from the recording based on the biometric data and the business process data, the one or more portions of interest comprising at least a first portion, the first portion comprising the first period of time; and
        building a modified recording by compiling the one or more portions of interest, the one or more portions of interest compiled by sampling frames from the recording at a variable sampling rate that increases as the duration of time that the customer service representative has been continuously working increases;
    wherein the variable sampling rate is greatest at an end of shift of the customer service representative; and
    wherein the variable sample rate increases during the time period that is more susceptible to errors by the customer service representative.

2. The computer program product of claim 1, wherein the one or more portions of interested are identified based on the biometric data exceeding a maximum threshold value.

3. The computer program product of claim 1, wherein the one or more portions of interested are identified based on at least one of the biometric data falling below a minimum threshold value and a rate of change of the biometric data falling outside an acceptable range.

4. The computer program product of claim 1, wherein the one or more portions of interested are identified based on a time period during the performance of the task in the business process data.

5. The computer program product of claim 1, wherein the sampling rate is positively correlated with a biometrically determined trigger of the customer service representative as indicated by the biometric data.

6. The computer program product of claim 1, wherein the sampling rate is positively correlated with the duration of time that the customer service representative has been continuously working as indicated by the business process data.

7. A system for performing summarization of a recording based on biometric and business process data, comprising:
a processor in communication with one or more types of memory, the processor configured to:
   receive the recording of a customer service representative performing a task;
   receive a biometric data from a sensor configured to monitor the customer service representative during the performance of the task;
   obtain business process data relating to one or more of the task and the customer service representative, the business process data comprising an indicator that identifies a time period that is more susceptible to errors by the customer service representative while performing the task;
   determine a duration of time that the customer service representative has been continuously working based on the business process data;
   determine that the biometric data over a first period of time is indicative of an increased anxiety level for the customer service representative;
   identify one or more portions of interest from the recording based on the biometric data and the business process data, the one or more portions of interest comprising at least a first portion, the first portion comprising the first period of time; and
   build a modified recording that compiles the one or more portions of interest, the one or more portions of interest compiled by sampling frames from the recording at a variable sampling rate that increases as the duration of time that the customer service representative has been continuously working increases;
   wherein the variable sampling rate is greatest at an end of shift of the customer service representative; and
   wherein the variable sample rate increases during the time period that is more susceptible to errors by the customer service representative.

8. The system of claim 7, wherein the one or more portions of interested are identified based on at least one of the biometric data exceeding a maximum threshold value, the biometric data falling below a minimum threshold value and a rate of change of the biometric data falling outside an acceptable range.

9. The system of claim 7, wherein the one or more portions of interested are identified based on a time period during the performance of the task in the business process data.

10. The system of claim 7, wherein the sampling rate is positively correlated with a biometrically determined trigger of the customer service representative as indicated by the biometric data.

11. The system of claim 7, wherein the sampling rate is positively correlated with the duration of time that the customer service representative has been continuously working as indicated by the business process data.

* * * * *